(No Model.) 3 Sheets—Sheet 1.

M. DOERFEL.
HARMONICA.

No. 546,733. Patented Sept. 24, 1895.

Witnesses:
J. B. Bolton
H. van Oldenneel

Inventor:
Max Doerfel
By Richards
his Attorneys.

ANDREW B. GRAHAM, PHOTO-LITHO, WASHINGTON, D.C.

(No Model.) 3 Sheets—Sheet 2.
M. DOERFEL.
HARMONICA.
No. 546,733. Patented Sept. 24, 1895.
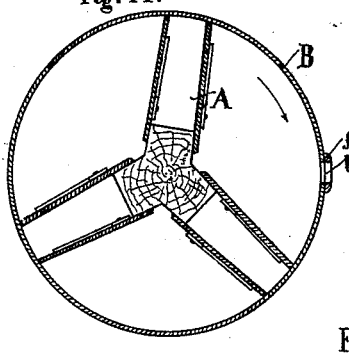
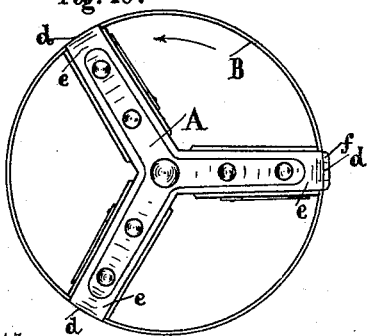
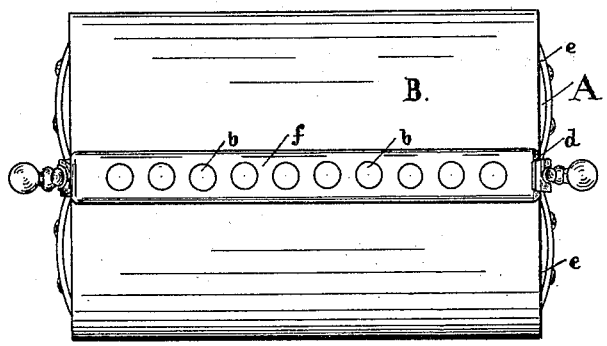
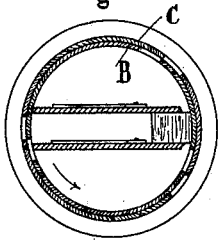
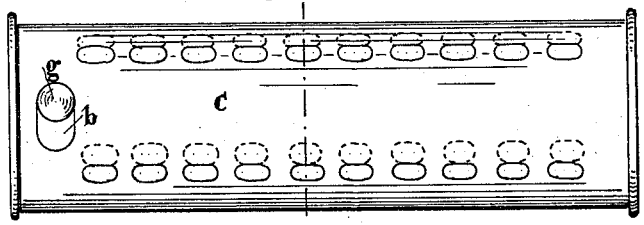
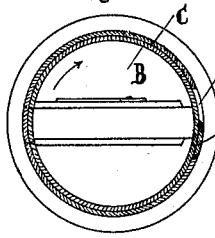
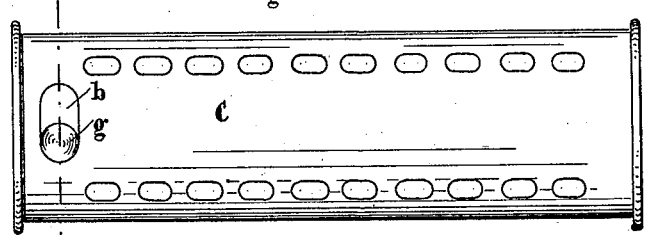
Witnesses:
Inventor:
Max Doerfel
By his Attorneys.

(No Model.) 3 Sheets—Sheet 3.
M. DOERFEL.
HARMONICA.
No. 546,733. Patented Sept. 24, 1895.
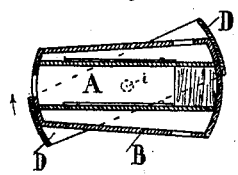
Fig. 21.
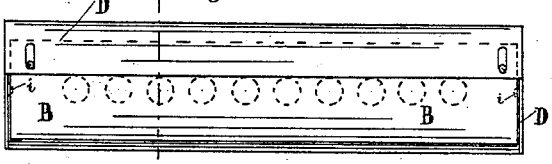
Fig. 20.
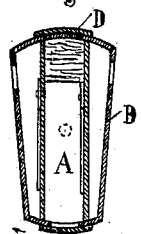
Fig. 23.
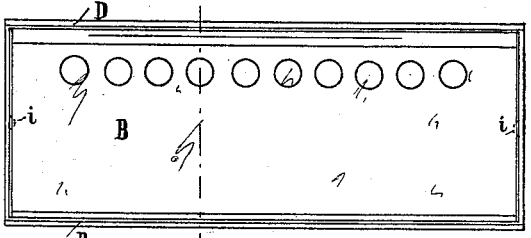
Fig. 22.
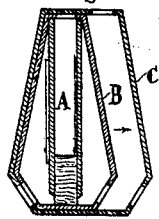
Fig. 26.
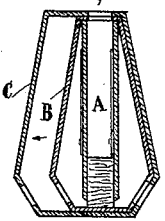
Fig. 25.
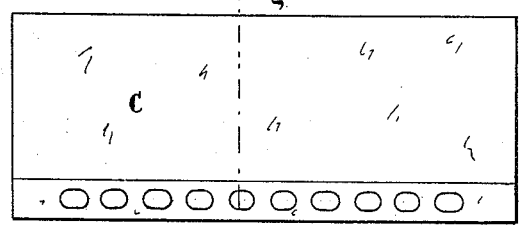
Fig. 24.
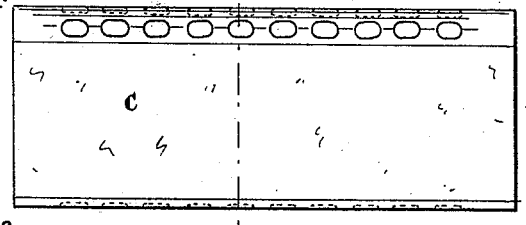
Fig. 28. Fig. 27.
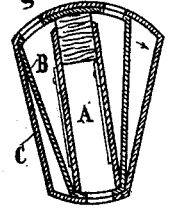
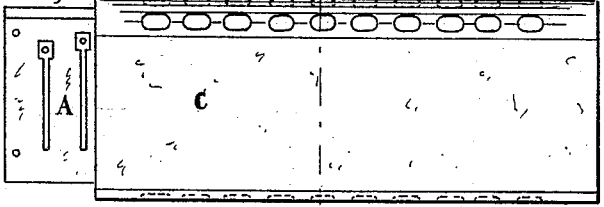
Fig. 30. Fig. 29.
Witnesses:
E. B. Bolton
H. van Oldenneel
Inventor:
Max Doerfel
By Richard
his Attorneys

UNITED STATES PATENT OFFICE.

MAX DOERFEL, OF KLINGENTHAL, GERMANY.

HARMONICA.

SPECIFICATION forming part of Letters Patent No. 546,733, dated September 24, 1895.

Application filed March 19, 1894. Serial No. 504,298. (No model.)

*To all whom it may concern:*

Be it known that I, MAX DOERFEL, manufacturer, a subject of the King of Saxony, German Emperor, residing at the village of Klingenthal, in the Kingdom of Saxony, Germany, have invented certain new and useful Improvements in Harmonicas, of which the following is a specification.

The improvements in harmonicas that constitute the subject-matter of the present invention refer to means adapted to protect the blow-holes or the blow-holes and the sound-holes, or the sound-holes alone, against dirt and permit cleaning of the same easily, the resonant body, which is provided with the vibrating reeds, being arranged to turn or move to and fro in a wholly or partly closed cylinder, which serves at the same time as a cover for the resonant body with its reeds, and is provided with blow-holes alone or with blow-holes and sound-holes in a corresponding manner, or if the resounding-body and its reed are loosely connected with the cylinder that constitutes the covering the whole is surrounded by a second cylinder provided with one or more rows of holes. In the latter case the resonant body, its reeds, and the cylinder that constitutes the covering can turn or move to and fro in the second cylinder.

Figure 1:
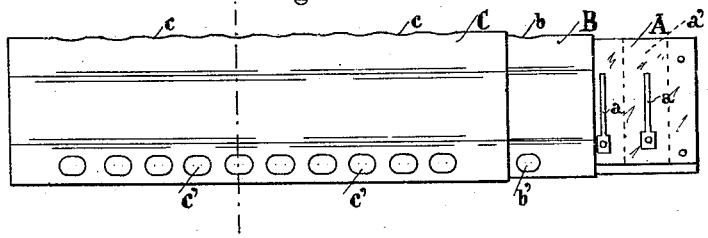
Figure 2:
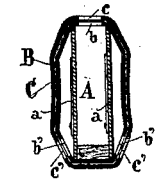
Figure 3:
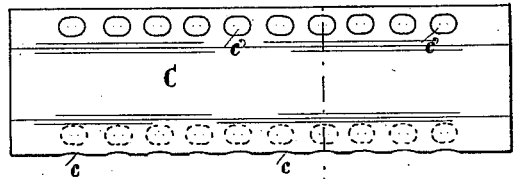
Figure 4:
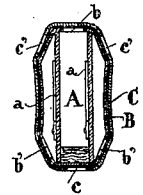
Figure 5:
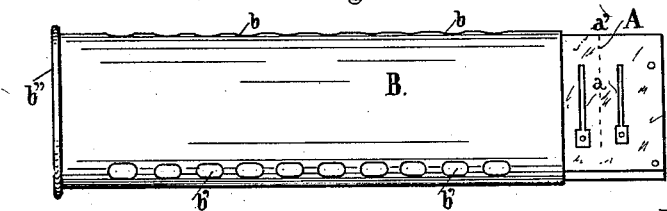
Figure 6:
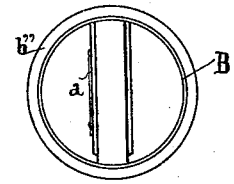
Figure 7:
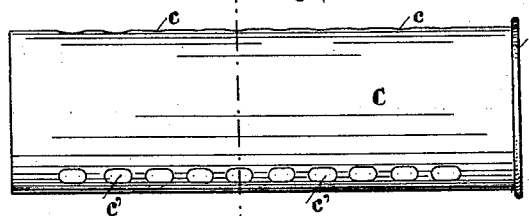
Figures 8, 9:
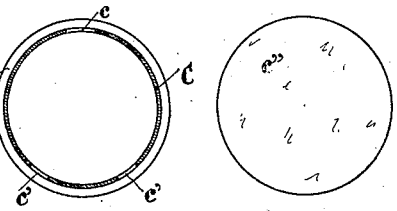
Figure 10:
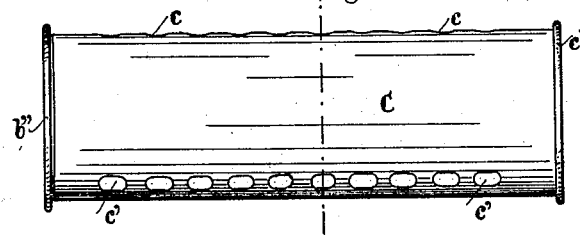
Figure 11:
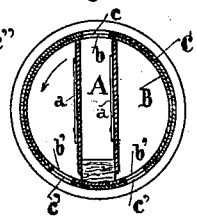
Figure 12:
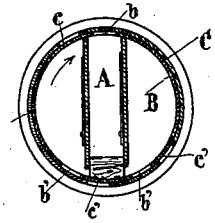

In the accompanying drawings, Figure 1 is a side view, and Fig. 2 a cross-section, of one form of my invention. Figs. 3 and 4 are similar views with parts adjusted into a different position. Figs. 5, 6, 7, and 8 are similar views of a modified form. Fig. 9 is an end view of the casing of Fig. 7. Figs. 10, 11, and 12 show side and cross-sectional views of another modification. Figs. 13, 14, and 15 are similar views of a further modification. Figs. 16, 17, 18, and 19 are similar views of another modification, including means for limiting the movements of the parts. Figs. 20, 21, 22, 23, 24, 25, 26, 27, 28, 29, and 30 are views of further modifications.

Figs. 1 to 4 show a mouth-harmonica which (see Fig. 1) comprises the resonant body A, carrying the sounding tongues or reeds $a$ and a cylinder B, provided with blow-holes $b$ and sound-holes $b'$ $b'$, corresponding in number to the air-passages $a'$ of the resonance wooden body. The cylinder B constitutes the covering of the sounding-tongues and is surrounded by a second cylinder C, which is provided with the same number of blow-holes $c$ and sound-holes $c'$. If the resonant wood body A is pushed into the cylinder B so that the air-passages $a'$ correspond with the blow-openings $b$, the mouth-harmonica is ready for use. In order to protect the air-passages $a'$ and the blow and sound holes $b$ $b'$ against the lodgment of dirt and impurities, a second cylinder C is pushed over the cylinder B, which, as stated, is provided with the same number of blow and sound holes $c$ $c'$ as the cylinder B. For using the instrument the blow and sound holes $c$ $c'$ of the cylinder C correspond exactly with those $b$ $b'$ of the cylinder B, which latter correspond with the air-passages $a'$, Fig. 2. If the blow and sound holes $b$ $b'$ of the cylinder B must be protected against dirt and impurities, it will be simply necessary to pull the cylinder C from the cylinder B, reverse it, and then push the same again over the cylinder B in such a manner that (see Figs. 3 and 4) the blow-holes $c$ of the cylinder C are turned downward and the sound-holes $c'$ $c'$ the same upward, so that the blow-opening $b$ and the sound-holes $b'$ of the cylinder B are covered and protected against catching dirt. The cylinders are held together by frictional contact. It is obvious that the cylinders that can be pushed the one into the other can be of any shape or cross-section, provided the inside cylinder B, that contains the resonant wood A, serves as a cover for the sounding-tongues $a$, and provided, also, that the outside cylinder C, after having been turned when the mouth-harmonica is not used, covers the blow and sound holes $b$ $b'$, and thereby the air-passages $a'$. In order that they can be turned for covering the blow and sound holes and in order that the different parts of the harmonica be easily cleaned, both cylinders are open on both sides.

Figs. 5 to 12 show an instrument in which, for the same purpose, two similar cylinders, but of a round cross-section, are used, each having one extremity closed by a bottom $b''$ $c''$. Both cylinders B C are constructed as above described. The inside cylinder B contains the resonant wood A, while the cylinder C surrounds the cylinder B in the same manner. The bottom $b''$ of the cylinder B and the bottom $c''$ of the cylinder C are opposite each other. If the blow-holes b and c are arranged so as to correspond with the air-passages a' of the resonant wood A, the mouth-harmonica is ready for use, as shown in Fig. 11. For covering the blow-holes b and the sound-holes b' of the cylinder B it is simply necessary to turn the cylinder C in such a manner about the cylinder B, that contains the wood A, that the walls of the outside cylinder cover the blow and sound holes of the inside cylinder, as shown in Fig. 12. For cleaning, the cylinder C is removed from the cylinder B and the resonant wood A from the cylinder B.

Figs. 13, 14, and 15 show a construction with a resonant wood body having several compartments comprising three separate instruments A, surrounded by one cylinder B, which constitutes the covering for all the resonant chambers A, and is provided with blow-holes b, just as the hereinbefore-described inside cylinder B. The front side of the cylinder B carries notches d, into which springs or strips e, fixed on the front side of the resonant wood body, engage, in order that the desired chamber or wood body be kept in the proper position. For easy playing on the instrument a perforated strip f is fixed over the blow-holes b, so that the lips of the player press upon the outside walls of the cylinder B, next to said strip f. By turning the resounding-wood A around to register with the blow-holes b while playing tones of varying pitch can be obtained while it will be only necessary to be careful that the springs e catch in the notches d. If it is desired to protect the air-passages or the blow-holes of the resounding wood body against impurities or dirt, it will only be necessary to put the same out of connection with the blow-holes by turning them inside the cylinder B, as shown in Fig. 14. If the strip f is not used, I can use a second cylinder for covering the blow and sound holes, as described above.

Figs. 16, 17, 18, and 19 show how two cylinders are used corresponding with the construction of Figs. 10, 11, and 12, with the exception that here, in order that the cylinders be put in the proper position relative to each other, the motion of the same is limited by a stud g, that, projecting from the inside cylinder B, moves in a slot h of the outside cylinder C, which limits the motion of the inside cylinder B. The stud g is so low that it does not prevent pulling the cylinders B and C apart, which enables the user to clean the instrument without trouble.

Figs. 20 to 23 show a construction in which the outside cylinder is replaced by a frame-piece D revoluble around the outside cylinder. The piece D is kept upon the resonant wood A and the cylinder B that constitutes the covering for the sounding-tongues by the stud i, which is at the same time the point around which it revolves. Fig. 21 shows a sectional view of the instrument in playing condition, while Fig. 23 shows the blow-holes covered.

In the constructions shown in Figs. 24 to 26 and Figs. 27 to 30 two cylinders B and C are used, which do not closely fit the one upon the other, as those previously described, but which are guided the one against the other at two opposite sides. In Figs. 24 to 26 the guiding sides are straight and parallel, while in Figs. 28 to 30 they are concentrically circular. By moving to and from or by turning the inside cylinder B with the resonant wood A the instrument is put in playing order or out of playing order in an analogous manner. In order that the instrument may be easily cleaned, the outside cylinder is pulled from the inside cylinder and the resonant wood is removed from the latter. The rotary movement of the resonance body within the casing constitutes a lateral adjustment or movement to throw the openings out of line.

I claim—

1. In a harmonica the combination with the casing having openings therein, of the resonance body arranged to be turned within said casing, substantially as described.

2. In a harmonica, the combination with the casing having openings therein, of the resonance body located within the same and having both a lateral and longitudinal movement therein, substantially as described.

3. In a harmonica, the combination with the casing comprising the two parts revolubly mounted one upon the other and having aligning openings arranged to be thrown out of alignment by the movement of one casing upon the other, of the resonance body sliding within the inner casing, substantially as described.

4. In combination, the resonant body, and the double casing about the same, one being arranged to move on the other.

5. In combination the resonant body and the double casing, one being arranged to turn on the other.

6. In a harmonica, the combination with the casing having openings, of the resonance body arranged to be turned therein to throw the openings into and out of alignment with the blow holes and the stop for said turning movement, substantially as described.

In witness whereof I have hereunto set my hand in presence of two witnesses.

MAX DOERFEL.

Witnesses:
S. EMIL SITZER,
RUDOLF SCHUSTER.